United States Patent
Teichmiller et al.

(10) Patent No.: US 11,958,022 B2
(45) Date of Patent: Apr. 16, 2024

(54) CONTROLLED HYDROLYSIS OF HAZARDOUS SILICON POLYMER RESIDUE

(71) Applicants: Mitsubishi Polycrystalline Silicon America Corporation (MIPSA), Theodore, AL (US); HIGH-PURITY SILICON CORPORATION, Yokkaichi (JP)

(72) Inventors: Wes Teichmiller, Theodore, AL (US); Bryan H. Nettles, Theodore, AL (US); Mark Servos, Theodore, AL (US); Matthias A. Colomb, Theodore, AL (US)

(73) Assignees: Mitsubishi Polycrystalline Silicon America Corporation (MIPSA), Theodore, AL (US); HIGH-PURITY SILICON CORPORATION, Yokkaichi (JP)

( * ) Notice: Subject to any disclaimer, the term of this patent is extended or adjusted under 35 U.S.C. 154(b) by 831 days.

(21) Appl. No.: 17/065,013

(22) Filed: Oct. 7, 2020

(65) Prior Publication Data

US 2022/0105477 A1  Apr. 7, 2022

(51) Int. Cl.
  *F25J 3/04* (2006.01)
  *B01F 23/10* (2022.01)
  *C01B 33/03* (2006.01)
  *C01B 33/107* (2006.01)

(52) U.S. Cl.
  CPC .............. *B01F 23/19* (2022.01); *C01B 33/03* (2013.01); *C01B 33/1071* (2013.01); *F25J 3/0403* (2013.01)

(58) Field of Classification Search
  CPC ..... B01F 23/19; C01B 33/03; C01B 33/1071; F25J 3/0403
  See application file for complete search history.

(56) References Cited

U.S. PATENT DOCUMENTS

2009/0188532 A1* 7/2009 Endoh ................. B08B 3/02
  134/198
2019/0002296 A1* 1/2019 Colomb ............... C01B 33/035

FOREIGN PATENT DOCUMENTS

JP     56114815 A  *  9/1981  ............. C01B 33/02

OTHER PUBLICATIONS

Machine translation of JP-56114815-A (Year: 1981).*

* cited by examiner

*Primary Examiner* — Erin F Bergner
(74) *Attorney, Agent, or Firm* — Locke Lord LLP

(57) ABSTRACT

A polymer handling method for a polycrystalline silicon manufacturing device, wherein the polymer byproducts are treated in a manner that the silicon polymers are hydrolyzed. The method creates a heated treatment gas with a moisture content that both treats the polymer to a depth of about 0.25 mm to prohibit formation of the friction and shock sensitive layer near the polymer surface and keeps the hydrolyzed polymer humidified. Furthermore the polymer handling method includes inactivation of the polymer, removal of the polymer of the system and disposal of the polymer after removal.

17 Claims, 3 Drawing Sheets

CONTROLLED HYDROLYSIS OF HAZARDOUS SILICON POLYMER RESIDUE

BACKGROUND OF THE INVENTION

1. Field of the Invention

The present invention relates to a method of inactivating polymers adhered to the inner surface of a reacting furnace and its associated piping, and downstream equipment in a polycrystalline silicon manufacturing device.

2. Description of Related Art

The Siemens method is known as a method of producing high-purity polycrystalline silicon to be used as semiconductor material, for example. This Siemens method is a production method of bringing a source gas composed of a mixed gas of chlorosilanes and hydrogen into contact with a heated silicon seed rod, and depositing polycrystalline silicon on the surface of the seed rod by reaction of the source gas. As an apparatus which carries out this production method, a polycrystalline silicon reactor in which many silicon seed rods are stood is used. Generally, the silicon seed rods are connected by a connecting member at upper ends thereof to form in a π-shape, and both lower ends thereof are fixed to electrodes which are installed at a plate at the bottom of the reactor.

An electric current is applied to the whole silicon seed rods from the electrodes located at both ends, and the whole silicon seed rods are heated to about 1,050° C. to 1,100° C. which is the thermal decomposing temperature of the source gas by Joule's heat by the electric current. The source gas supplied into the reactor contacts the surfaces of the silicon seed rods heated in this way, and is thermally decomposed or hydrogen-reduced, whereby polycrystalline silicon is deposited on the surfaces of the silicon seed rods. As this reaction proceeds continuously, rod-like polycrystalline silicon grows into large, thick rods.

The exhaust gas produced by the reactions include silicon tetrachloride which is a by-product, unreacted chlorosilane gas, silicon powders, polymer compounds including $Si_2Cl_6$, $Si_2H_2Cl_4$ and the like, hydrogen gas and hydrogen chloride. The polymer compounds are cooled in the reactor furnace and the exhaust gas piping and are thus precipitated on inner circumferential surfaces of the piping and the reacting furnace. Since the polymers easily ignite upon exposure to air, it is necessary to inactivate them.

Currently, the method described in Japanese Patent No. 2818780 is employed to inactivate the polymers. In this method, chlorosilane such as silicon tetrachloride ($SiCl_4$) is injected into the exhaust piping of a polycrystalline silicon manufacturing device and the adhered polymers are dissolved and removed by the chlorosilane.

However, when the remaining $SiCl_4$ is exposed to air, safety hazards including the generation of a large amount of hydrochloric acid gas may occur. Thus, in attempting to safely inactivate the polymers, additional hazards are created.

A method for treating the silicon polymers is sought which minimizes safety risks to workers.

BRIEF SUMMARY OF THE INVENTION

The present invention was developed in view of this. The object of the present invention is to safely inactivate the residual polymers of the polycrystalline silicon manufacturing process.

The production of polysilicon produces an unwanted byproduct of silicon polymers. Before exposure to moisture of any type, the polymers are in their raw state and are called "raw polymer." The raw polymers produce HCl gas when exposed to air or moisture. The product becomes unstable when exposed to moisture of any type, becoming hydrolyzed, and then is flammable even in a nitrogen atmosphere. For example, if the silicon polymers are exposed to moisture in the atmosphere they may spontaneously and violently deflagrate from the heat of hydrolysis. The polymers exposed to moisture may also spontaneously and violently deflagrate from static discharge, by changes in pressure, from friction, and from impact. These reactions are extremely exothermic.

The proposed invention is a method to treat the polymer byproducts in a manner that controls the rate of reaction of hydrolysis. Introduction of the controlled hydrolysis process provided the means to control the moisture and oxygen content, as well as the temperature of the hydrolysis treatment gas. The balance of the treatment gas is an inert gas. The weight of polymer, ratio of equipment volume to polymer weight, and exposed surface area of the polymer are some factors which determine reaction rate; however, they are typically set by the system and so must be well understood for accurate calculations. The solid byproduct remaining after treating the polymer can be removed. The byproduct gas after treatment may be safely treated, by purging to a scrubber for instance, without exposure to workers. This invention treats the flammable byproduct in a controlled manner to reduce worker exposure to hazards such as deflagration and noxious HCl fumes.

DETAILED DESCRIPTION OF THE INVENTION

Figure 1:
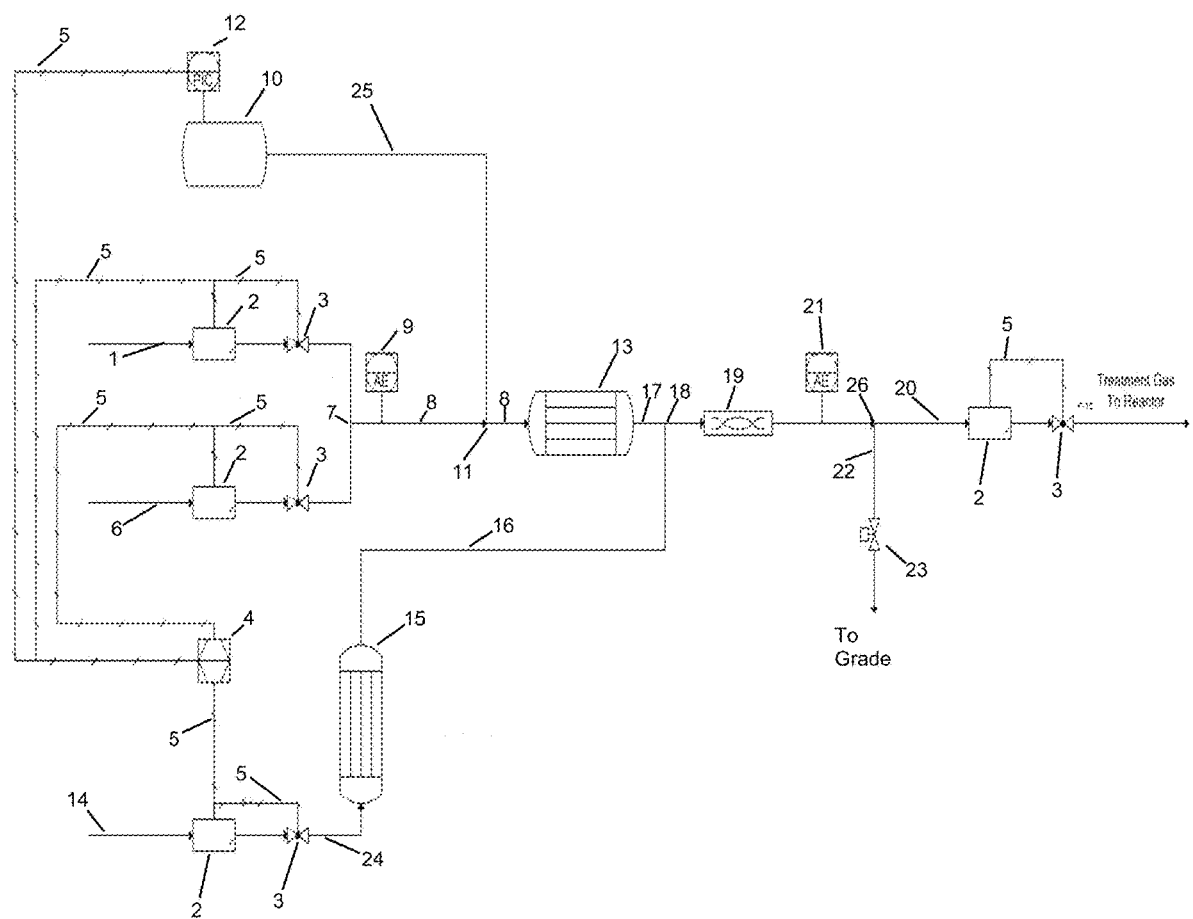
FIG. 1 is a controlled polymer hydrolysis system that treats raw polymer and can prevent the autoignition of treated raw silicon polymer.

Hereinafter, the polymer inactivation method for a polycrystalline silicon manufacturing device according to the present invention will be described with reference to FIG. 1.

In the Siemen's process for producing polysilicon, trichlorosilane (TCS) and hydrogen are passed over a heated circuit of polysilicon seed rods at a temperature of about 1,000° C. where additional silicon is deposited by chemical vapor deposition in a reactor (CVD reactor). The process is complex but can be summarized by the following three equations.

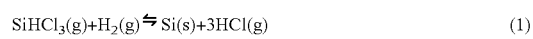
$$SiHCl_3(g) + H_2(g) \rightleftharpoons Si(s) + 3HCl(g) \tag{1}$$

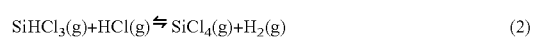
$$SiHCl_3(g) + HCl(g) \rightleftharpoons SiCl_4(g) + H_2(g) \tag{2}$$

$$SiHCl_3(g) + H_2(g) \rightleftharpoons SiH_2Cl_2(g) + HCl(g) \tag{3}$$

Additional products of the reactions are silicon dimers and polymers which form as gases and are deposited as a viscous liquid on cooled surfaces of the reactor and exhaust piping. Although the present invention is used to treat the byproducts of the polycrystalline silicon manufacturing process, other chemical reactions and processes like silicon epitaxy produce the same polymers. The polymers are of the general form $Si_xH_yCl_z$ where $x>=2$, y may be zero and is typically zero to 3, and $z>=3$ and is typically 3 to 16. The byproduct is a mixture of products of the generic form $Si_xH_yCl_z$.

The silicon polymers formed in the polycrystalline silicon manufacturing process are typically one or more of the following polymers: non-hydrolyzed $Si_2Cl_6$, non-hydrolyzed $Si_2HCl_5$, non-hydrolyzed $Si_2H_2Cl_4$, non-hydrolyzed $Si_3Cl_8$, and non-hydrolyzed $Si_4Cl_{10}$. After treatment or upon exposure to humid air the chemicals become hydrolyzed or partially hydrolyzed.

More specifically, side reactions occur to produce the dimers and polymers of silicon, primarily consisting of hexachlorodisilane (HCDS). HCDS is formed by the following two processes.

$$Si(s)+SiCl_4(g) \rightleftharpoons 2Si_2Cl_6(g) \qquad (4)$$

$$2SiHCl_3(g) \rightleftharpoons Si_2Cl_6(g)+H_2(g) \qquad (5)$$

Polymer compounds account for about 0.5% of the weight of the exhaust gas from the Siemen's process of which 95.5% is HCDS, 4.1% is $Si_2HCl_5$, and 0.4% is $Si_2H_2Cl_4$. The exhaust gas also contains small fractions of higher order polymers such as $Si_3Cl_8$. These higher boiling silicon polymers deposit as fouling on the CVD reactor walls, plate, and exhaust piping. Initially, when these compounds are deposited, the fouling has characteristics of a viscous liquid like honey and is called "raw polymer." This polymer also contains dissolved flammable chlorosilanes such as TCS.

The raw polymer product is readily ignitable and has been observed to ignite after coming into contact with ambient air. Amounts of raw polymer of about five grams burn with a candle-like flame and larger amounts of about 1 kg or more burn with a persistent fire. The fire can be suppressed by elimination of oxygen. The raw polymer immediately begins a complex hydrolysis reaction with water; even the moisture in the air. The hydrolyzed polymer creates a backbone of silicon complexes (Si—Si and Si—O—Si) and replaces primarily Si—Cl groups with Si—OH groups. In addition, hydrolysis releases hydrogen chloride (HCL) and hydrogen gas. It is thought that hydrolyzed polymer deflagration occurs by the fast oxidation of the Si—Si bonds, which can occur in an inert atmosphere. This reaction releases hydrogen, which in an oxygenated atmosphere burns and adds to the intensity of the fire. Hydrolyzed polymer burns with violent deflagration and releases intense heat. The deflagration of hydrolyzed polymer in an inerted environment, such as in pure nitrogen is visibly less intense but a violent deflagration still occurs.

Once the batch of polysilicon in the CVD reactor is finished, the reactor chamber must be lifted to harvest the polysilicon rods. The preparation for this step and period of harvesting the polysilicon rods are hazardous processes where fires and deflagrations can occur. For the harvest to occur, the raw polymer must be hydrolyzed to prevent noxious HCl fuming and to reduce the likelihood of spontaneous ignition of the raw polymer. Hydrolysis without sufficient moisture creates an additional hazard. A partially hydrolyzed layer of polymer near the surface has been observed to be shock and friction sensitive. The hydrolyzed polymer crust burns with violent deflagration followed by a burn that is typical of raw polymer.

A system and process were developed to mitigate these diverse sets of hazards as effectively as possible. This controlled polymer hydrolysis process uses hydrolysis gas to treat the reactor exhaust piping, the reactor plate, and the reactor chamber and is subsequently exhausted to a scrubbing system. The controlled polymer hydrolysis system design requirements for treatment of raw polymer are as follows:

First, create an atmosphere that prevents the raw polymer from igniting, as it has been observed to ignite spontaneously when exposed to atmospheric air, by keeping the oxygen concentration less than about 3 volume % (vol %) at ambient temperature and pressure. In the event of a hydrolyzed polymer fire, keeping the oxygen concentration less than 3 vol % prevents the combustion of hydrogen thereby reducing the energy release by about 30%. For example, an atmosphere can be created in which oxygen concentration is in the range of 0 vol % to less than 3 vol %. An atmosphere can be created in which the oxygen concentration is specifically one of the following percent (vol %): 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8 and 2.9 vol %. The remainder of the atmosphere can be an inert gas or mixture of inert gases selected from one or more of the following inert gases: nitrogen, helium, neon, argon, krypton or xenon.

Second, create a heated treatment gas with a moisture content that both treats the polymer to a depth of about 0.25 mm to prohibit formation of the friction and shock sensitive layer near the polymer surface and keeps the hydrolyzed polymer humidified. The dried polymer is sensitive to electrostatic shock of about 0.03 Joules (J). This number (0.03 Joules (J)) is greatly increased, which mitigates the hazard, when humidified. The system should produce a hydrolyzing gas with preferably about 100 grains of moisture at a temperature of preferably about 57° C. to achieve these requirements.

The typical thickness of polymer deposition varies depending on equipment surface temperature and to a lesser extent surface geometry. Polymer thickness varies between 0.2-1 mm with a 0.4 mm thickness average. Layers thicker than 0.5 mm can present additional hazards when processing; however, the polymer hydrolysis treatment system is still considered a best practice.

Grains of moisture is a measure of the grains of moisture per pound of dry air typically measured at standard atmospheric pressure. For example 100 grains of moisture at 21° C. and 1 atmospheric pressure is about 90% relative humidity. 100 grains equals 0.006480 kg $H_2O$/1 kg dry air, independent of temperature and pressure. In this case, hydrolyzing gas can have a range of 90 to 120 grains of moisture at a temperature range of about 50° C. to 70° C. The grains of moisture can specifically be one of the following number of grains: 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, and 120 grains. The temperature, in degrees Celsius, within the range can be specifically 50, 51, 52, 53, 54, 55, 56, 57, 58, 59, 60, 61, 62, 63, 64, 65, 66, 67, 68, 69, and 70° C.

Third, create a system flow rate that treats the polymer sufficiently quickly and in a uniform manner without creating enough turbulence to cause polymer cracking or flaking. The flow rate in the system should not exceed about 0.15 m/s. This flow rate is the flow rate of treatment gas into the CVD reactor. For example, the system gas flow rate, in meters/second, can be 0.06, 0.07, 0.08, 0.09, 0.10, 0.11, 0.12, 0.13, 0.14 and 0.15 m/s. Insufficient flow rate, for example a flow rate of 0.05 m/s and less can create a thin (0.01 to 0.2 mm) hydrolyzed layer on the polymer. Such a layer can become a barrier to further hydrolysis, so flow rates closer to 0.15 m/s are preferred.

As polymer is hydrolyzed, it releases HCl and hydrogen gas. The treatment time should proceed until the byproduct gases of HCl and hydrogen are no longer produced. This indicates the hydrolysis reaction has finished and the hydrolyzed polymer layer has been formed. This layer greatly slows the mass transfer of water from the treatment gas to the raw polymer beneath it and prevents further hydrolysis. The treatment gas parameters of temperature, moisture content, and flow rate influence the depth of the hydrolyzed polymer layer.

Figure 2:
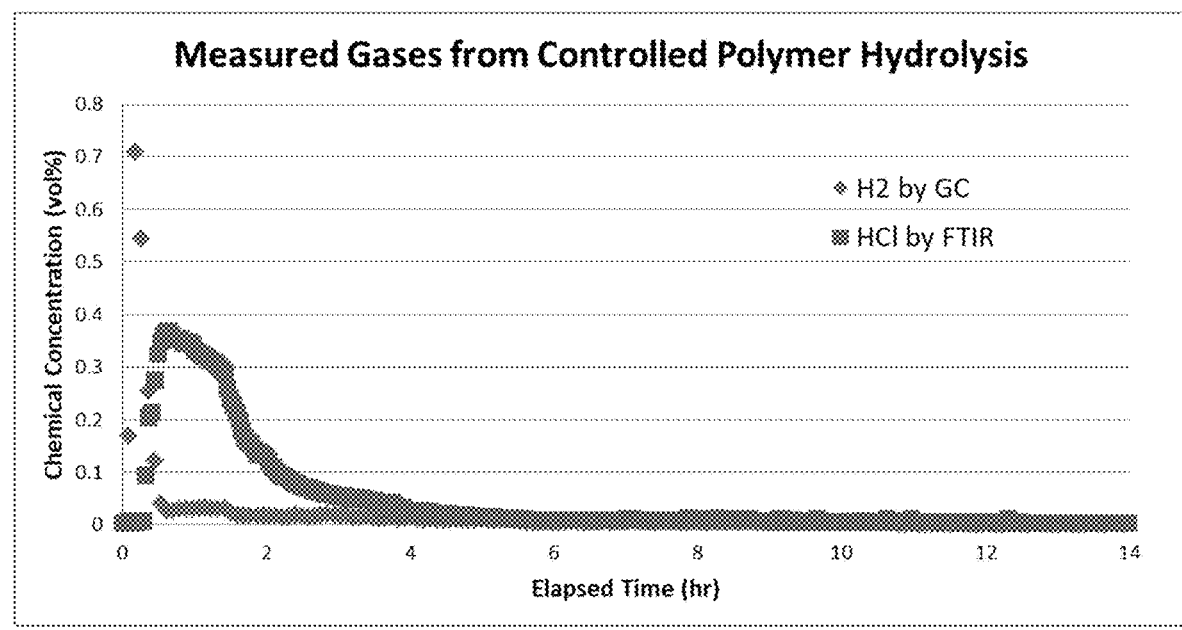
FIG. 2 is a graph showing chemical concentration of off gasses from polymer hydrolysis.

To better understand the time to polymer hydrolysis completion, treatment gas parameters of temperature, moisture content, and flow rate were set as previously stated, and then the time to polymer hydrolysis completion was studied. In the study, about 11 kg of polymer was hydrolyzed by the treatment gas to create the hydrolyzed surface 0.25 mm in depth. The total amount of polymer deposited on the equipment and the surface area of the equipment will effect treatment time. The treatment gas exhausted from the system was tested for HCl by Fourier-transform infrared spectroscopy (FTIR) and for hydrogen by gas chromatography (GC). The GC had a detection limit of 0.004 vol % hydrogen and the FTIR had a detection limit of 0.001 vol % HCL. The reaction is considered complete when hydrogen drops below 0.004 vol % hydrogen and 0.004 vol % HCl. A typical controlled polymer hydrolysis is shown in FIG. 2 and was considered completed after 13 hours of treatment.

Before introduction of the controlled polymer hydrolysis process, the hydrolysis process utilized moisture in the ambient air for hydrolysis of the silicon based polymers. The moisture content in the ambient air varies with seasonal and current weather conditions, yielding inconsistent hydrolysis results and occasional process upsets. Introduction of the controlled hydrolysis process provided the means to control the moisture and oxygen content, as well as the temperature of the hydrolysis treatment gas. The balance of the treatment gas is an inert gas. The role of oxygen in the hydrolysis of silicon polymers was unknown at the time of the invention, so the oxygen content was controlled below the limiting oxygen concentration (LOC) in vol % for raw polymer to burn, but not eliminated in case oxygen had an effect on the hydrolysis process. Although the exact LOC was not determined, raw polymer was not flammable in environments with less than 3 vol % oxygen. It is now thought that oxygen concentration should be below the LOC, but is not required at all for effective treatment.

A system for controlled polymer hydrolysis is created to control the temperature, moisture and oxygen content of the hydrolysis treatment gas. In such a system, an example of which is shown in FIG. 1, an inert gas line 1 is fed into the system by a control valve, consisting of a flow element 2 and a globe valve 3, controlled by a ratio controller 4, which is connected to and in communication with the flow element 2 and the globe valve 3 by electronic, electromagnetic or physical means depicted in FIG. 1 as ratio control line 5. Similarly an instrument air line 6 is fed into the system by a control valve consisting of the flow element 2 and the globe valve 3 controlled by the ratio controller 4 which is connected to and in communication with the flow element 2 and the globe valve 3 by electronic, electromagnetic or physical means depicted in FIG. 1 as ratio control line 5. Instrument air is made from compressed ambient air with moisture removed for a dew point of less than 40° C. The same numbers are used to indicate parts which are the same or perform the same or similar function. The inert gas line 1 and the instrument air line 6 are connected together at a line junction 7 and fed as a single line 8 into the system by the control valves to create a gas blend with less than 3 vol % oxygen content, which is achieved by the ratio controller 4. An oxygen sensor 9 on line 8, connected by electronic, electromagnetic or physical means to the ratio controller 4, monitors the oxygen concentration.

A cushion tank 10 is added to increase system gas volume to allow more precise gas flow control through the system's control valves. Cushion tank 10 connects via a line 25 to line 8 at a line junction 11. The system is set to maintain from 10 to 15 psig, including 11, 12, 13 and 14 psig, but preferably about 12 psig, with a pressure gauge 12 connected to the cushion tank 10 that outputs relevant data/information to the ratio controller 4. The pressure gauge 12 is connected to and in communication with the ratio controller 4 by electronic, electromagnetic or physical means depicted in FIG. 1 as ratio control line 5.

The blended gas stream of inert gas and instrument air is sent via line 8 through a heater 13 to achieve a target temperature in the range of 50° C. to 70° C. The target temperature of hydrolysis gas is selected to provide sufficiently rapid mass transfer of moisture to the polymer, while preventing temperatures high enough to cause ignition of the polymer. The increase of treatment gas temperature once blended with steam is small (less than 2° C.). A pure water line 14 is connected to an evaporator 15 by a line 24 and metered by a control valve, consisting of the flow element 2 and the globe valve 3, controlled by the ratio controller 4, which is connected to and in communication with the flow element 2 and the globe valve 3 by electronic, electromagnetic or physical means depicted in FIG. 1 as ratio control line 5.

Pure water is metered to the evaporator 15 by the control valve, which also receives its set point from the ratio controller 4. Steam is generated by the evaporator 15 which is blended with the inert gas and the instrument air so that the final blended gas has a moisture content in the range of 90 to 120 grains of moisture. The evaporator 15 is connected via a line 16 to a line 17, exiting the heater 13, at a line junction 18.

The line 17 enters into a static mixer 19. The contents of line 17 pass through the static mixer 19 to ensure thorough mixing, and the stream's moisture content is checked by an in-line moisture analyzer 21 on a line 20 which exits the static mixer 19.

Located at a line junction 26, the system includes a purge line 22 with a dump valve 23 to direct gas mixture flow away from the hydrolysis treatment areas so that the intended moisture content is achieved prior to feeding forward to the CVD reactor system (not shown). Finally, the mixed gas flows to each reactor system (not shown) via the line 20 is which set or controlled by a control valve consisting of the flow element 2 and the globe valve 3, controlled by the ratio controller 4, which is connected to and in communication with the flow element 2 and the globe valve 3 by electronic, electromagnetic or physical means depicted in FIG. 1 as ratio control line 5.

Such a system was created that succeeded in establishing a hydrolysis environment that satisfied the design requirements. The following is provided as one example of the operation of the system. Referring to FIG. 1 as an example of the system, nitrogen, from inert gas line 1, and instrument air, from instrument air line 6, are fed into the system by control valves to create a gas blend with about 2.8 vol % oxygen content, which is achieved by the ratio controller 4. The system is set to maintain about 12 psig with the pressure gauge 12 that outputs to the ratio controller. The pressure in the system upstream from the final globe valve 3 in the system, before the treatment gas is sent to the reactor system (not shown), is kept at 12 psig where the oxygen, moisture, and temperature are measured. After the final globe valve 3 in the system, the pressure is nearly atmospheric pressure. The blended gas stream is sent through the heater 13 to achieve a target temperature of about 57° C. The cushion tank 10 provides increased gas volume to allow more precise gas flow control through the system's control valves. Pure water, via pure water line 14, is metered to the evaporator 15 by a control valve, which also receives its set point from the ratio controller 4. Steam is generated by the evaporator 15 which is blended with the nitrogen and the instrument air so that the final blended gas has a moisture content of about 100 grains. The gases pass through the static mixer 19 to ensure thorough mixing, and the stream's moisture content is checked by the in-line moisture analyzer 21. Dump valve 23 on purge line 22 directs flow away from the hydrolysis treatment areas (not shown) so that the intended moisture content is achieved prior feeding forward to the CVD reactor system (not shown). Finally, flow to each reactor system is set or controlled by a control valve linked to a flow meter. The system creates a treatment gas with 2.8% vol oxygen, 100 grains of moisture, and flow rate of 175 standard cubic feet per minute (scfm), which for this system results in an average velocity of 0.12 m/s.

A controlled polymer hydrolysis system, such as the one described above, has prevented the autoignition of treated raw silicon polymer. It is thought that raw silicon polymer is extremely volatile even to shock and friction in a semi-hydrolyzed state. Controlled raw silicon polymer hydrolysis ensures that the top layer of raw polymer is thoroughly hydrolyzed. The rate of hydrolysis of the polymer and the depth of the layer are a function of the treatment gas moisture content, temperature, and length of hydrolysis treatment time. Mass transfer of water to the polymer is relatively slow and becomes slower with time as the hydrolyzed layer is hydrophobic in nature. It is thought that having this unstable layer closer to the surface (1 mm) makes detonation due to vibration or friction a greater hazard. The hydrolyzed polymer is subsequently humidified by the treatment gas reducing sensitivity to electrostatic discharge. Finally, the oxygen concentration is kept below the limiting oxygen concentration of raw polymer to prevent more easily ignited raw polymer from combusting the violently flammable hydrolyzed polymer.

The temperature, moisture and oxygen conditions during the reaction should be regulated so that the silicon polymers hydrolyze. To accomplish silicon polymer hydrolyzing thoroughly, it may require several treatment cycles. This will ensure safety during the reaction and after the reaction when the equipment is opened and the inside is exposed to the atmosphere.

Figure 3:
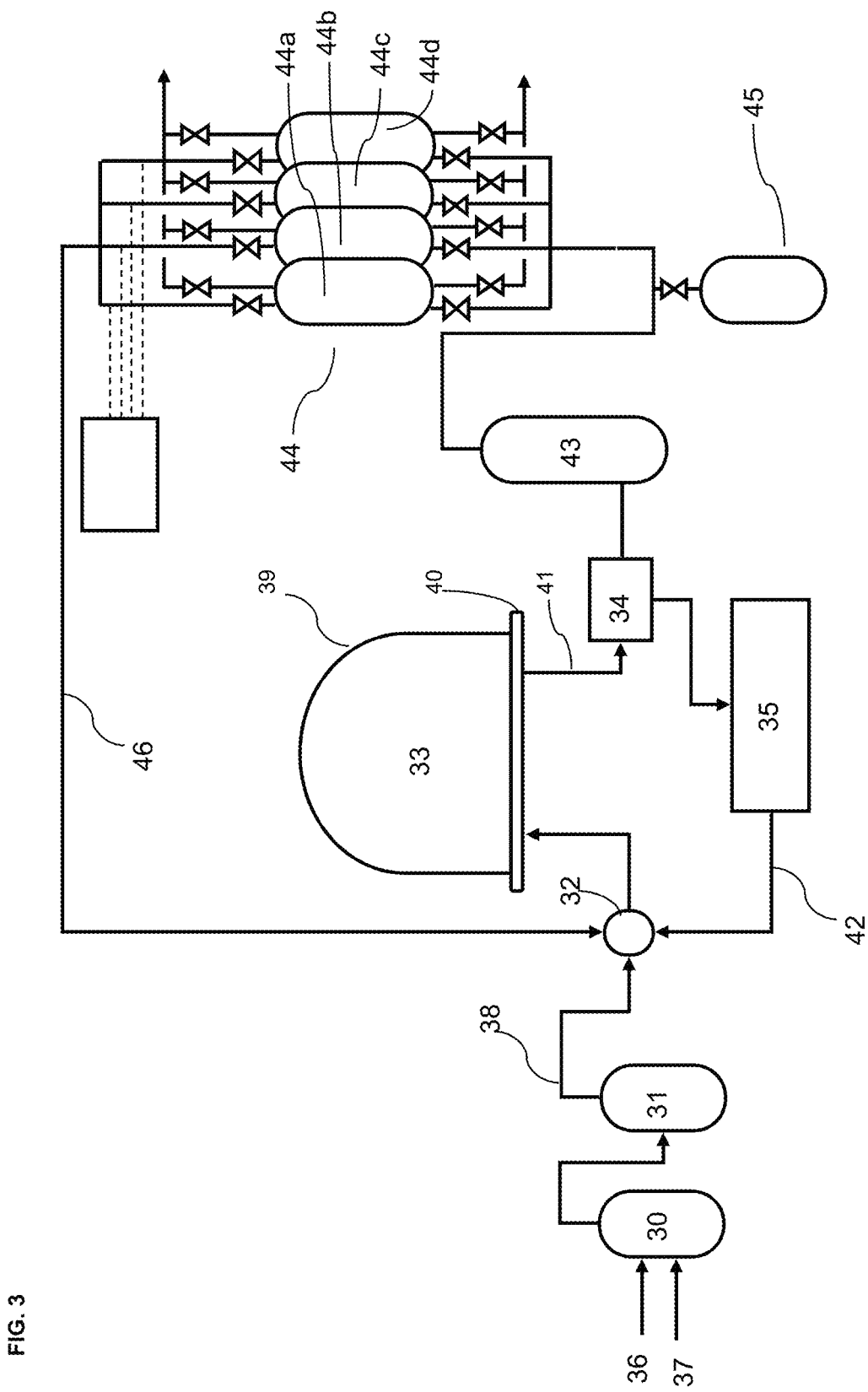
FIG. 3 is an illustration of the polycrystalline silicon producing process equipment.

FIG. 3 is an illustration of polycrystalline silicon producing process equipment having adsorption towers in a recovery step. This primary polycrystalline silicon producing process equipment comprises a fluidized bed chlorinator 30, a distillation series 31 comprising a plurality of distillation towers, a vaporizer 32, a polycrystalline silicon reactor 33, a condenser 34, and a distillation tower 35.

TCS is produced in the fluidized bed chlorinator 30 by reacting metallurgical grade silicon powder (abbreviated "Me-Si") of about 98% purity fed via line 36 with a hydrogen chloride gas (HCl) fed via line 37. The TCS is purified in the distillation series 31 and a vapor fraction of the distillation, as the purified TCS, is fed to the vaporizer 32 via feed line 38. In the vaporizer 32, the purified TCS is vaporized and mixed with $H_2$ and the mixed gas is fed to the polycrystalline silicon reactor 33 as raw material gases. The polycrystalline silicon reactor 33 ("Siemens reactor") has a bell jar shaped chamber cover 39, a plate 40, exhaust gas piping 41 and a plurality of internal polycrystalline silicon seed rods (not shown). The silicon seed rods are heated and the purified TCS and $H_2$ are fed into the reactor 33. Polycrystalline silicon is deposited on the silicon seed rods. Exhaust gases from the reaction include unreacted TCS, unreacted $H_2$, HCl, STC ($SiCl_4$), DCS ($SiH_2Cl_2$) and other chlorosilanes. The exhaust gases are fed to the condenser 34 and chlorosilane groups, such as TCS, STC, DCS and other chlorosilanes are condensed, so that they are separated from the gases including $H_2$ and HCl in the condenser 35. The condensed chlorosilane groups are fed to the distillation tower 35 and TCS is separated and is purified in the distillation tower 35. The purified TCS in the distillation tower 35 is fed to the vaporizer 32 via feed line 42 and is reused as raw material gas.

The gases separated in the condenser 34, including $H_2$ and HCl, are fed to a HCl adsorbing tower 43. In the HCl adsorbing tower 43, most of HCl is adsorbed and other gases are fed to adsorption towers 44a, b, c and d (abbreviated "adsorption towers 44"). An inert gas, like Ar gas, supply unit 45 is located between the HCl adsorption tower 43 and the adsorption towers 44. The purified hydrogen, which passed through the adsorption towers 44, is fed to the vaporizer 32 via a feed line 46 and is reused as raw material.

The exhaust gas produced by the polycrystalline silicon producing reactions include silicon tetrachloride which is a by-product, unreacted chlorosilane gas, silicon powders, polymer compounds including $Si_2Cl_6$, $Si_2H_2Cl_4$ and the like, hydrogen gas and hydrogen chloride. The polymer compounds are cooled in the Siemens reactor 33 and the exhaust gas piping 41 and are thus precipitated on inner circumferential surfaces of the Siemens reactor 33 and the exhaust gas piping 41.

The polymer that remains in this system after treatment is found on the Siemens reactor chamber cover 39, plate 40, and exhaust gas piping 41. The hydrolyzed polymer is very hazardous if not treated properly burning with a violent deflagration if ignited. The chamber cover 39 is removed from the reactor 33 and the remaining polymer on the walls is treated with high pressure water jets. The water jets physically remove the adhered polymer. The polymer is significantly diluted by the water and is sent by sump pumps to a waste water treatment facility. The polymer remaining on the reactor plate 40 is treated in the same way.

After removal of the chamber cover 39, a slight nitrogen purge is placed on the exhaust system. The exhaust port openings are loosely covered with threaded polytetrafluoroethylene (PTFE) caps to allow for nitrogen to flow out of the caps. The system has a high pressure alarm system to disable the nitrogen pressure thereby preventing the possibility of dislodging the caps. The hydrolyzed polymer in the exhaust gas piping 41 is not physically removed before the next batch of polysilicon is made. Testing has shown that heating hydrolyzed polymer to 350° C. for thirty minutes renders the polymer inert. The polymer remaining in the exhaust gas piping 41 is subjected to the exhaust gas of the subsequent batch which heats it above the target temperature of 350° C. for longer than thirty minutes thereby rendering it inert.

Although this disclosure has discussed the treatment of a reaction furnace, the process may be used for any pressure containing equipment that contains polymer such as sections of piping, heat exchangers, and wash towers. The piping and equipment need not be in-line for treatment. Piping or equipment that has been isolated by valves or blind flanges may be removed and then treated in the previously described manner in a dedicated facility.

The present invention is not limited to the embodiments and various modifications may be made without departing from the concept of the present invention.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

The invention claimed is:

1. A polymer handling method, comprising:
providing a sealable vessel containing silicon polymers which are a byproduct of a production of polycrystalline silicon in a Siemens process or a byproduct from a silicon epitaxy reactor;
sealing the vessel to close the vessel to prevent gas or fluid leaking from the vessel;
filling the vessel with an atmosphere having an oxygen concentration in the range of 0.1 to 3 volume %;
filling the vessel with a hydrolyzing gas having a range of about 90 to 120 grains of moisture over a temperature range of about 50 to 70° C.;
whereby the silicon polymers are, in whole or in part, humidified.

2. The polymer handling method of claim 1, wherein the silicon polymers are one or more polymers selected from the group consisting of: non-hydrolyzed $Si_2Cl_6$, non-hydrolyzed $Si_2HCl_5$, non-hydrolyzed $Si_2H_2Cl_4$, non-hydrolyzed $Si_3Cl_8$, and non-hydrolyzed $Si_4Cl_{10}$.

3. The polymer handling method of claim 1, wherein a flow rate of gas filling the vessel does not exceed about 0.15 m/s.

4. The polymer handling method of claim 1, wherein when filling the vessel with the atmosphere having an oxygen concentration in the range of 0.1 to less than 3 volume %, the gas having the majority concentration is an inert gas.

5. The polymer handling method of claim 1, wherein when filling the vessel with the atmosphere having an oxygen concentration in the range of 0.1 to less than 3 volume %, the gas having the majority concentration is a member selected from the group consisting of nitrogen, helium, neon, argon, krypton or xenon.

6. The polymer handling method of claim 1, wherein filling the vessel with a hydrolyzing gas having a moisture content of about 100 grains of moisture.

7. The polymer handling method of claim 1, wherein the vessel is filled with a hydrolyzing gas having a moisture content of about 100 grains of moisture at about 57° C.

8. The polymer handling method of claim 1, wherein the humidification of silicon polymers is in an amount selected from the group consisting of: about 25%, about 35%, about 45% about 50%, about 65%, about 75%, about 85%, about 95% and about 100%.

9. The polymer handling method of claim 1, further comprising:
opening the vessel and treating the vessel with pressurized water; and
collecting the water containing diluted polymer; and
waste treating the water containing diluted polymer to remove wastes from the water.

10. A polymer handling method for a polycrystalline silicon manufacturing device, comprising:
providing the polycrystalline silicon manufacturing device containing silicon polymers which are a byproduct of a production of polycrystalline silicon in a Siemens process or a byproduct from a silicon epitaxy reactor;
sealing the polycrystalline silicon manufacturing device to close the polycrystalline silicon manufacturing device to prevent gas or fluid leaking from the polycrystalline silicon manufacturing device;
filling the polycrystalline silicon manufacturing device with an atmosphere having an oxygen concentration less than 3 volume %;
filling the polycrystalline silicon manufacturing device with a hydrolyzing gas having a range of about 90 to 120 grains of moisture over a temperature range of about 50 to 70° C.;
whereby the silicon polymers are, in whole or in part, humidified;
opening the polycrystalline silicon manufacturing device and treating the polycrystalline silicon manufacturing device with pressurized water;
collecting the water containing diluted polymer;
waste treating the water containing diluted polymer to remove wastes from the water;
covering exhaust port openings of an exhaust system of the polycrystalline silicon manufacturing device with threaded polytetrafluoroethylene (PTFE) caps to allow for nitrogen to flow out of the caps; and
placing a nitrogen purge on the exhaust system of the polycrystalline silicon manufacturing device.

11. The polymer handling method of claim 10, wherein the silicon polymers are one or more polymers selected from the group consisting of: non-hydrolyzed $Si_2Cl_6$, non-hydrolyzed $Si_2HCl_5$, non-hydrolyzed $Si_2H_2Cl_4$, non-hydrolyzed $Si_3Cl_8$, and non-hydrolyzed $Si_4Cl_{10}$.

12. The polymer handling method of claim 10, wherein the flow rate of gas filling the polycrystalline silicon manufacturing device does not exceed about 0.15 m/s.

13. The polymer handling method of claim 10, wherein when filling the polycrystalline silicon manufacturing device with the atmosphere having an oxygen concentration less than 3 volume %, the gas having the majority concentration is an inert gas.

14. The polymer handling method of claim 10, wherein when filling the polycrystalline silicon manufacturing device with the atmosphere having an oxygen concentration less than 3 volume %, the gas having the majority concentration is a member selected from the group consisting of nitrogen, helium, neon, argon, krypton or xenon.

15. The polymer handling method of claim 10, wherein filling the polycrystalline silicon manufacturing device with a hydrolyzing gas having a moisture content of about 100 grains of moisture.

16. The polymer handling method of claim 10, wherein filling the polycrystalline silicon manufacturing device with a hydrolyzing gas having a moisture content of about 100 grains of moisture at about 57° C.

17. The polymer handling method of claim 10, wherein the humidification of silicon polymers is in an amount selected from the group consisting of: about 25%, about 35%, about 45% about 50%, about 65%, about 75%, about 85%, about 95% and about 100%.

* * * * *